(12) United States Patent
Ito et al.

(10) Patent No.: US 10,589,722 B2
(45) Date of Patent: Mar. 17, 2020

(54) SERVER DEVICE, CAR SHARING SYSTEM, INFORMATION PROCESSING METHOD, AND RECORDING MEDIUM

(71) Applicant: TOYOTA JIDOSHA KABUSHIKI KAISHA, Toyota-shi (JP)

(72) Inventors: Yuki Ito, Iwakura (JP); Ryuichi Suzuki, Nagakute (JP); Hiroyasu Shiokawa, Nagoya (JP); Yasumasa Kobayashi, Nagoya (JP); Naoki Yamamuro, Nagoya (JP); Makoto Akahane, Nagoya (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 16/208,609

(22) Filed: Dec. 4, 2018

(65) Prior Publication Data
US 2019/0193681 A1    Jun. 27, 2019

(30) Foreign Application Priority Data

Dec. 26, 2017 (JP) ................................. 2017-250188

(51) Int. Cl.
*B60R 25/24* (2013.01)
*G06K 9/00* (2006.01)
(Continued)

(52) U.S. Cl.
CPC ............ *B60R 25/246* (2013.01); *B60R 25/24* (2013.01); *B60R 25/241* (2013.01); *B60R 25/25* (2013.01); *G06F 21/32* (2013.01); *G06K 9/00288* (2013.01); *G06Q 30/0645* (2013.01); *B60R 2325/101* (2013.01); *B60R 2325/103* (2013.01); *B60R 2325/205* (2013.01)

(58) Field of Classification Search
CPC ........ B60R 2325/101; B60R 2325/103; B60R 2325/205; B60R 25/24; B60R 25/241; B60R 25/246; B60R 25/25; G06F 21/32; G06K 9/00288
See application file for complete search history.

(56) References Cited

U.S. PATENT DOCUMENTS

2017/0140452 A1*   5/2017   Li ...................... G06Q 30/0623

FOREIGN PATENT DOCUMENTS

JP          2012-118848         6/2012

* cited by examiner

*Primary Examiner* — Omeed Alizada
(74) *Attorney, Agent, or Firm* — Oblon, McClelland, Maier & Neustadt, L.L.P.

(57) ABSTRACT

A server device for a car sharing system includes an image request device, a use permission request device, and an authentication information issue device. The image request device is configured to transmit an image request signal to the user terminal when a use request signal for the vehicle is received. The image request signal requires transmission of a user face image. The use permission request device is configured to transmit a use permission request signal including the user face image transmitted from the user terminal to the owner terminal. The authentication information issue device is configured to transmit predetermined authentication information to the user terminal when a use permission signal transmitted from the owner terminal in response to the use permission request signal is received. The predetermined authentication information is information for enabling an operation of the vehicle.

5 Claims, 4 Drawing Sheets

(51) Int. Cl.
*G06Q 30/06* (2012.01)
*G06F 21/32* (2013.01)
*B60R 25/25* (2013.01)

FIG. 4

| USER ID | USE PERIOD | OWNER ID | STATUS |
|---|---|---|---|
| S001 | 2017/11/01/1000~2017/11/01/1400 | W001 | END |
| S002 | 2017/11/05/0800~2017/11/06/1600 | W002 | IN USE |
| S003 | 2017/11/08/1000~2017/11/08/2000 | W003 | RESERVED |

FIG. 5

| OWNER ID | CAR MODEL | COLOR | NUMBER PLATE | VEHICLE POSITION | AVAILABLE TIME |
|---|---|---|---|---|---|
| W001 | ... | WHITE | XXYY | ... | ... |

CAR MODEL, COLOR, NUMBER PLATE: VEHICLE IDENTIFICATION INFORMATION

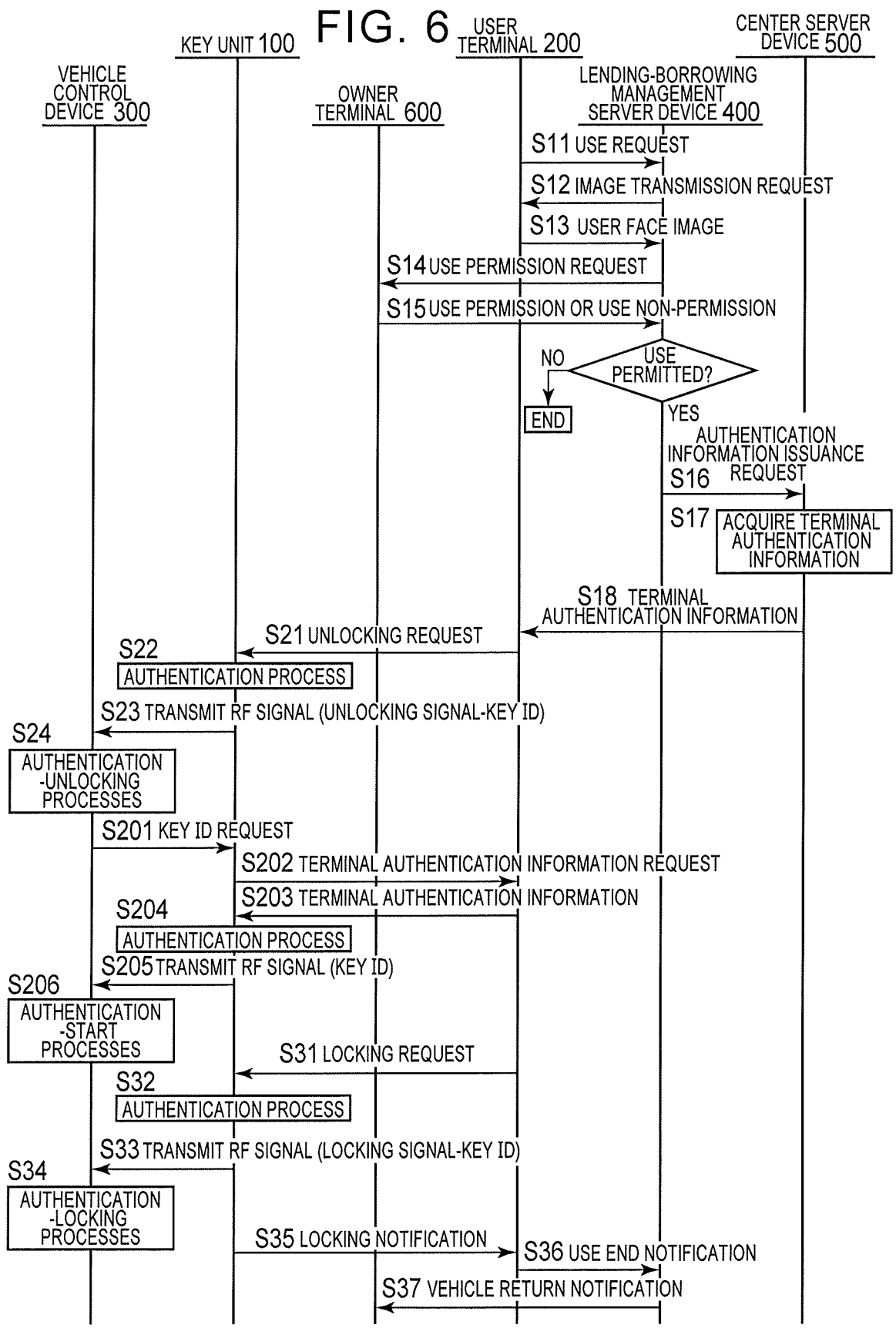

SERVER DEVICE, CAR SHARING SYSTEM, INFORMATION PROCESSING METHOD, AND RECORDING MEDIUM

INCORPORATION BY REFERENCE

The disclosure of Japanese Patent Application No. 2017-250188 filed on Dec. 26, 2017 including the specification, drawings and abstract is incorporated herein by reference in its entirety.

BACKGROUND

1. Technical Field

The present disclosure relates to a server device, a car sharing system, an information processing method, and a recording medium for a car sharing service.

2. Description of Related Art

In recent years, a technique has been proposed that enables operations of a vehicle (locking-unlocking operations of vehicle doors, on-off operations of a vehicle power supply, start-stop operations of a prime mover installed in a vehicle, etc.) by using a mobile device such as a smartphone instead of a vehicle key. By using such a technique, it can be easily realized to allow a person other than an owner of a vehicle, i.e. a person who does not have a physical vehicle key, to temporarily operate the vehicle. Consequently, the advent of new methods for using vehicles or new services using vehicles is expected. For example, Japanese Unexamined Patent Application Publication No. 2012-118848 (JP 2012-118848 A) discloses a system that requires mutual authentication to be performed between a vehicle offered for car sharing (or a server device that manages the vehicle) and a mobile device of a user who is to be a borrower of the vehicle (hereinafter may be referred to as a "user terminal"). In this system, when the authentication has succeeded, the operation of the vehicle by the user is enabled. According to such a system, lending and borrowing of a vehicle is made possible without delivery of a physical vehicle key between an owner to be a lender of the vehicle and a user to be a borrower of the vehicle.

SUMMARY

In the meantime, according to the above-described conventional system, when a vehicle is rented out, an owner to be a lender of the vehicle and a user to be a borrower of the vehicle do not need to actually meet each other. Therefore, there is a possibility that it may be difficult for the owner to catch the personality or the like of the user. Consequently, there is a possibility that the owner to be the lender of the vehicle may feel anxious about renting out the vehicle.

The disclosure provides a technique that, in performing a car sharing service that uses a mobile device as a vehicle key, can reduce anxiety of an owner to be a lender of a vehicle at the time when the owner rents out the vehicle.

The disclosure relates to a car sharing system that uses a user terminal of a user to be a borrower instead of a vehicle key. In the disclosure, when a use request for a vehicle from the user terminal has occurred, the most recent face image of the user captured after the occurrence of the use request is transmitted along with a use permission request for the vehicle to an owner terminal of an owner to be a lender. As a result, the owner can determine whether or not to permit use of the vehicle by the user by reference to the most recent face image of the user.

An aspect of the present disclosure relates to a server device applied to a car sharing system. The server device is for managing a service of renting a vehicle from an owner to be a lender of the vehicle to a user to be a borrower of the vehicle. The user is capable of using the service by using a user terminal. The owner is capable of using the service by using an owner terminal. The server device includes an image request device, a use permission request device, and an authentication information issue device. The image request device is configured to transmit an image request signal to the user terminal when a use request signal for the vehicle transmitted from the user terminal is received. The image request signal is a signal for requesting capturing an image of a face of the user and requesting transmission of a user face image that is a captured image. The use permission request device is configured to transmit a use permission request signal to the owner terminal when the user face image transmitted from the user terminal in response to the image request signal is received. The use permission request signal is a signal including the user face image and information requesting a use permission of the vehicle. The authentication information issue device is configured to transmit predetermined authentication information to the user terminal when a use permission signal transmitted from the owner terminal in response to the use permission request signal is received. The authentication information issue device is configured not to transmit predetermined authentication information to the user terminal when a use non-permission signal transmitted from the owner terminal in response to the use permission request signal is received. The use permission signal is a signal for permitting use of the vehicle. The predetermined authentication information is information for enabling an operation of the vehicle. The use non-permission signal is a signal for not permitting use of the vehicle.

According to the server device described above, when a use request signal transmitted from the user terminal of the user to be the borrower of the vehicle is received by the server device, the image request device transmits to the user terminal an image request signal being a signal for requesting capturing an image of a face of the user and requesting transmission of a captured image (user face image). When the user face image transmitted from the user terminal in response to the image request signal is received by the server device, the use permission request device transmits a use permission request signal including the user face image to the owner terminal of the owner to be the lender of the vehicle. In this event, the owner of the vehicle can determine whether or not to permit use of the vehicle by the user by reference to the user face image received by the owner terminal. The user face image is the most recent face image of the user captured after the user terminal has received the image request signal from the server device. Then, when a signal transmitted from the owner terminal to the server device in response to the use permission request signal is a use permission signal, the authentication information issue device transmits predetermined authentication information for enabling an operation of the vehicle to the user terminal. After the predetermined authentication information is received by the user terminal, the user can perform operations of the vehicle (locking-unlocking operations of doors, on-off operations of a vehicle power supply, start-stop operations of a prime mover installed in the vehicle, etc.) by using the user terminal. Consequently, use of the vehicle by the user is enabled. On the other hand, when a signal transmitted from the owner terminal to the server device in response to the use permission request signal is a use non-permission signal, the authentication information issue device does not transmit predetermined authentication information for enabling an operation of the vehicle to the user terminal. In this event, a signal indicating that use of the vehicle is impossible, or the like may be transmitted from the server device to the user terminal. In this case, since an operation of the vehicle using the user terminal becomes impossible, use of the vehicle by the user becomes impossible.

Therefore, according to the server device of the disclosure, when a use request for a vehicle has occurred from a user terminal of a user to be a borrower of the vehicle, an owner to be a lender of the vehicle can determine whether or not to permit use of the vehicle by the user by reference to a face image of the user captured most recently. Therefore, it is possible to reduce anxiety of the owner at the time when the owner rents out the vehicle.

The server device may be applied when the vehicle includes an on-board unit configured to accept an operation request for the vehicle from the user terminal. The server device may be configured to transmit information, that is used by the on-board unit for the authentication of the user terminal, to the user terminal as the predetermined authentication information, when authentication of the user terminal has succeeded. According to this configuration, since the user cannot operate the vehicle unless the user carries the terminal of which the authentication by the on-board unit has succeeded, it is possible to suppress an operation of the vehicle by a terminal other than the legitimate user terminal.

Another aspect of the present disclosure related to a car sharing system for renting a vehicle from an owner to be a lender of the vehicle to a user to be a borrower of the vehicle. The car sharing system includes a user terminal, an owner terminal, and a server device. The user terminal is used by the user. The user terminal is configured to transmit a use request signal that is a signal for requesting use of the vehicle. The owner terminal is used by the owner. The server device is for managing the vehicle. The server device is configured to, when the use request signal from the user terminal is received, communicate with the user terminal to acquire a user face image and transmit the user face image and a use permission request signal to the owner terminal. The owner terminal is configured to, when the use permission request signal from the server device is received, transmit a use permission signal or a use non-permission signal to the server device in response to the use permission request signal. The server device is configured to, when the use permission signal transmitted from the owner terminal is received, transmit predetermined authentication information for enabling an operation of the vehicle to the user terminal. The server device is configured to, when the use non-permission signal transmitted from the owner terminal is received, not transmit the predetermined authentication information to the user terminal. The user face image is a captured image of a face of the user. The use permission request signal is a signal including the user face image and information requesting a use permission of the vehicle. The use permission signal is a signal for permitting use of the vehicle. The use non-permission signal is a signal for not permitting use of the vehicle.

According to the car sharing system described above, the owner to be the lender can determine whether or not to permit use of the vehicle by reference to the most recent face image of the user to be the borrower (user face image). In this event, when the owner does not wish use of the vehicle by the user, the owner may transmit a use non-permission signal from the owner terminal to the server device so that issuance of predetermined authentication information from the server device to the user terminal is not performed. Therefore, use of the vehicle by the user is made impossible. On the other hand, when the owner wishes use of the vehicle by the user, the owner may transmit a use permission signal from the owner terminal to the server device so that issuance of predetermined authentication information from the server device to the user terminal is performed. Therefore, use of the vehicle by the user is made possible. Consequently, it is possible to reduce anxiety of the owner at the time when the owner rents out the vehicle.

Further, another aspect of the present disclosure related to an information processing method executed by a computer for a car sharing system. The car sharing system is for renting a vehicle from an owner to be a lender of the vehicle to a user to be a borrower of the vehicle. The car sharing system includes a user terminal that is used by the user, an owner terminal that is used by the owner. The information processing method includes: transmitting an image request signal to the user terminal when a use request signal for the vehicle transmitted from the user terminal is received, the image request signal being a signal for requesting capturing an image of a face of the user and requesting transmission of a user face image being a captured image; transmitting a use permission request signal to the owner terminal when the user face image transmitted from the user terminal in response to the image request signal is received, the use permission request signal being a signal including the user face image and information requesting a use permission of the vehicle; transmitting predetermined authentication information for enabling an operation of the vehicle to the user terminal when a use permission signal transmitted from the owner terminal in response to the use permission request signal is received, the use permission signal being a signal for permitting use of the vehicle; and not transmitting the predetermined authentication information to the user terminal when a use non-permission signal transmitted from the owner terminal in response to the use permission request signal is received, the use non-permission signal being a signal for not permitting use of the vehicle.

By the disclosed information processing method, when car sharing system is carried out by using a mobile terminal as a key of the vehicle, it is possible to reduce anxiety of the owner at the time when the owner rents out the vehicle.

Another aspect of the present disclosure related to a non-transitory readable recording medium storing a program that causes a computer to execute a control process for a car sharing system. The car sharing system is a system for renting a vehicle from an owner to be a lender of the vehicle to a user to be a borrower of the vehicle. The car sharing system includes a user terminal that is used by the user, an owner terminal that is used by the owner. The control process includes: transmitting an image request signal to the user terminal when a use request signal for the vehicle transmitted from the user terminal is received, the image request signal being a signal for requesting capturing an image of a face of the user and requesting transmission of a user face image being a captured image; transmitting a use permission request signal to the owner terminal when the user face image transmitted from the user terminal in response to the image request signal is received, the use permission request signal being a signal including the user face image and information requesting a use permission of the vehicle; transmitting predetermined authentication information for enabling an operation of the vehicle to the user terminal when a use permission signal transmitted from the owner terminal in response to the use permission request signal is received, the use permission signal being a signal for permitting use of the vehicle; and not transmitting the predetermined authentication information to the user terminal when a use non-permission signal transmitted from the owner terminal in response to the use permission request signal is received, the use non-permission signal being a signal for not permitting use of the vehicle.

By the disclosed recording medium, when the car sharing system is carried out by using a mobile terminal as a key of the vehicle, it is possible to reduce anxiety of the owner at the time when the owner rents out the vehicle.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 4 is a diagram showing an example of a table configuration of lending-borrowing information stored in a lending-borrowing management DB;

FIG. 5 is a diagram showing an example of a table configuration of vehicle management information stored in the lending-borrowing management DB; and FIG. 6 is a flow diagram showing the flows of data and processing that are performed between the respective components in the car sharing system according to the embodiment.

DETAILED DESCRIPTION OF EMBODIMENTS

Hereinafter, a specific embodiment of the disclosure will be described with reference to the drawings. Unless otherwise noted, the sizes, materials, shapes, relative arrangements, and so on of components described in this embodiment are not intended to limit the technical scope of the disclosure only thereto.

Outline of Car Sharing System

Figure 1:
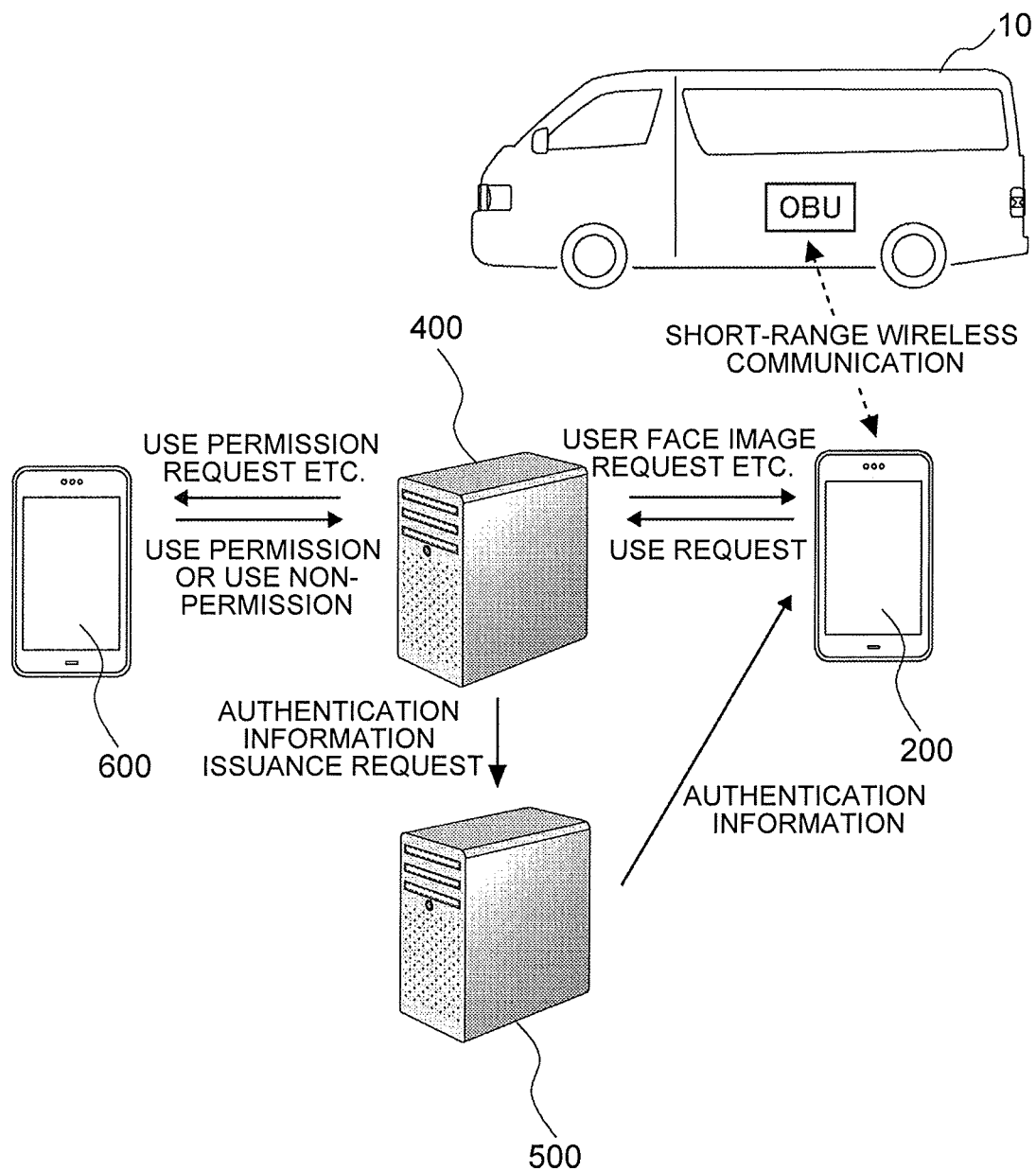
FIG. 1 is a diagram showing a schematic configuration of a car sharing system to which the disclosure is applied.

FIG. 1 is a diagram showing a schematic configuration of a car sharing system according to the disclosure. The car sharing system referred to herein is a system for realizing a service such that a user to be a borrower of a vehicle is allowed to temporarily use the vehicle by obtaining a use permission from an owner to be a lender of the vehicle. As shown in FIG. 1, the car sharing system in this embodiment includes an on-board unit (OBU), a user terminal 200, a lending-borrowing management server device 400, a center server device 500, and an owner terminal 600.

The OBU is installed in a vehicle 10 that is a lending-borrowing object of the car sharing system in this embodiment. The OBU performs a predetermined authentication process based on predetermined authentication information possessed by the user terminal 200 and determines whether or not to respond to a user's vehicle operation based on the authentication result. User's vehicle operations include locking-unlocking operations of vehicle doors, on-off operations of a vehicle power supply, start-stop operations of a prime mover in the vehicle 10, and so on.

The user terminal 200 is a mobile terminal that is used by a user to be a borrower of the vehicle 10. The user referred to herein is supposed to be a person (an individual) who actually operates the vehicle 10 when using the vehicle 10. The user terminal 200 acquires predetermined authentication information when the user uses the vehicle 10. Then, when the user operates the vehicle 10, the user terminal 200 transmits the acquired predetermined authentication information to the OBU.

The lending-borrowing management server device 400 is placed in a company or the like that mediates a lending-borrowing contract exchanged between an owner to be a lender of the vehicle 10 and a user to be a borrower of the vehicle 10. Upon receipt of a use request for the vehicle 10 from the user terminal 200, the lending-borrowing management server device 400 acquires the most recent face image of the user (user face image). Then, the lending-borrowing management server device 400 transmits a use permission request for the vehicle 10 along with the acquired user face image to the owner terminal 600. In response thereto, a use permission signal is transmitted from the owner terminal 600, so that the use permission signal is received by the lending-borrowing management server device 400. Then, the lending-borrowing management server device 400 requests the center server device 500 to transmit predetermined authentication information, that is for enabling the operation of the vehicle 10, to the user terminal 200. In this event, in addition to a signal for requesting the transmission of the predetermined authentication information to the user terminal 200, identification information of the owner to be the lender of the vehicle 10 is also transmitted from the lending-borrowing management server device 400 to the center server device 500.

Based on the owner identification information received from the lending-borrowing management server device 400, the center server device 500 identifies the vehicle 10 that is associated with the owner identification information. Then, the center server device 500 transmits predetermined authentication information relating to the identified vehicle 10 to the user terminal 200. After the predetermined authentication information transmitted from the center server device 500 is received by the user terminal 200, the user to be the borrower of the vehicle 10 can operate the vehicle 10 using the user terminal 200. The predetermined authentication information may be transmitted from the center server device 500 directly to the user terminal 200 as described above, or alternatively it may be transmitted from the center server device 500 indirectly to the user terminal 200 via the lending-borrowing management server device 400.

The owner terminal 600 is a terminal that is used by an owner to be a lender of the vehicle 10. The owner referred to herein is a person having the right of possession of the vehicle 10 and is, for example, an individual or a body corporate. In the case of the body corporate, a business person or the like who offers a car sharing service is included. The owner terminal 600 is a terminal that is used by the owner described above. In this event, when the owner is an individual, the owner terminal 600 may be a terminal that is carried by the owner, or a terminal that is placed in the residence of the owner. When the owner is a body corporate or an organization, such as a business person, the owner terminal 600 may be a terminal that is placed in an office or the like, or a terminal that is carried by a staff member of the office. The owner terminal 600 described above is used for receiving a use permission request and a user face image from the lending-borrowing management server device 400 and for transmitting a response to the use permission request (a use permission signal or a use non-permission signal) to the lending-borrowing management server device 400.

System Configuration

Figure 2:
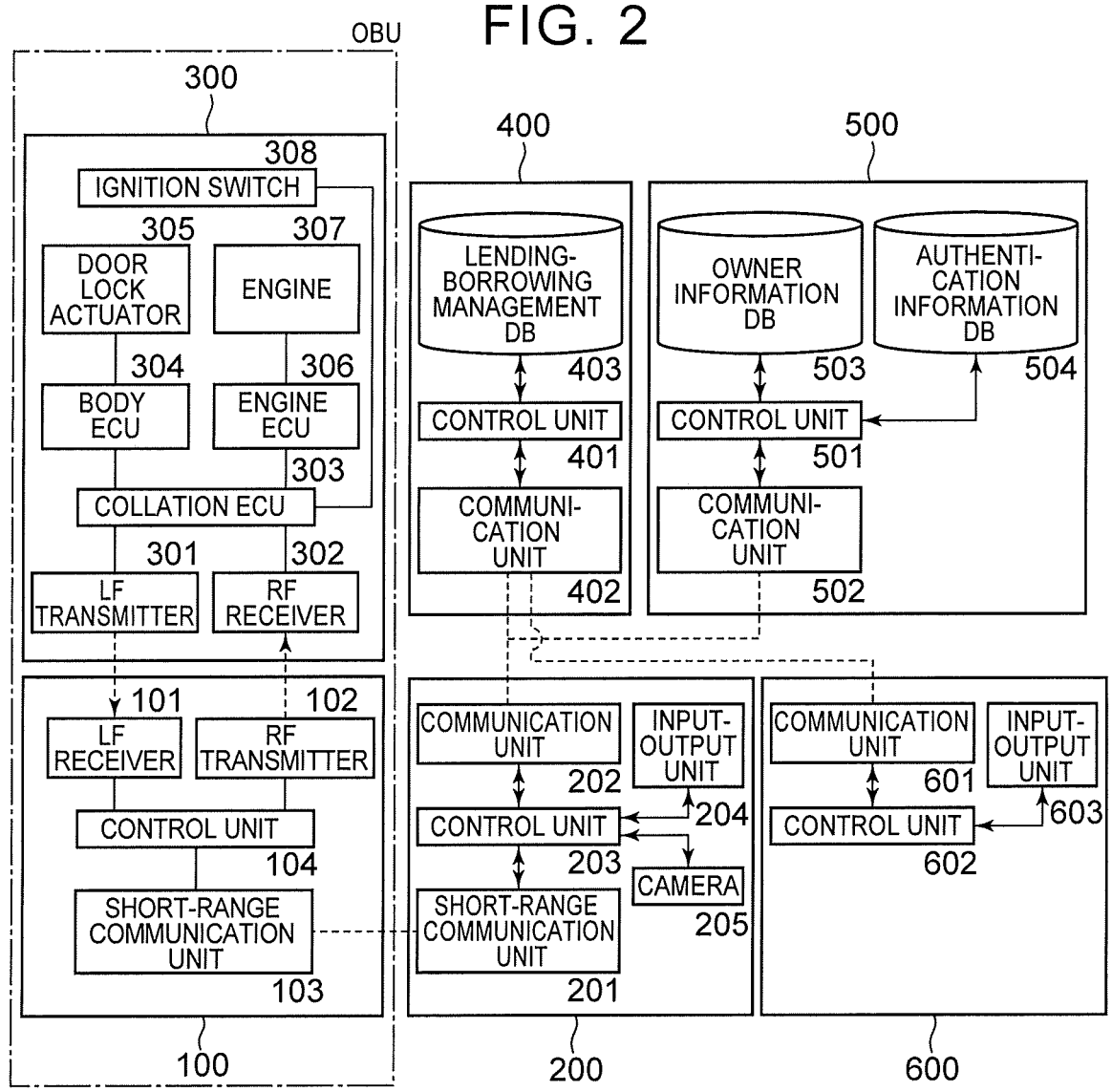
FIG. 2 is a block diagram schematically showing an example of components included in a car sharing system according to an embodiment.

Herein, the respective components of the car sharing system will be described in detail. FIG. 2 is a block diagram schematically showing an example of configurations of the On-Board Unit (OBU), the user terminal 200, the lending-borrowing management server device 400, the center server device 500, and the owner terminal 600 shown in FIG. 1.

On-Board Unit

As shown in FIG. 2, the On-Board Unit (OBU) includes a key unit 100 and a vehicle control device 300. The key unit 100 has a wireless interface similar to an electronic key (mobile device) of a smart key. By communicating with the existing vehicle control device 300, the key unit 100 can lock and unlock the vehicle 10, turn on and off the vehicle power supply, start and stop the vehicle prime mover, and so on without using a physical key. The key unit 100 performs short-range wireless communication with the user terminal 200 for authentication of the user terminal 200 and, based on the authentication result, determines whether or not to behave as an electronic key of the vehicle 10 by itself. The key unit 100 and the vehicle control device 300 are operated by electric power that is supplied from a battery installed in the vehicle 10.

The vehicle control device 300 is a device for controlling various operations of the vehicle 10 and is an existing device that forms part of a smart key system. The various operations include operations of locking and unlocking the doors of the vehicle 10, operations of turning on and off the vehicle power supply, operations of starting and stopping the vehicle prime mover, and so on. Specifically, the vehicle control device 300 locks or unlocks the doors of the vehicle 10 according to a locking signal or an unlocking signal that is transmitted via electromagnetic waves in a radio frequency (RF) band from an electronic key (hereinafter may be referred to as a "mobile device") possessed by an owner of the vehicle 10. The vehicle control device 300 performs authentication of the mobile device by transmitting electromagnetic waves in a low frequency (LF) band for polling the mobile device when the owner (or a person aboard the vehicle with the owner) has performed a specific operation. The specific operation may be an on-off operation of the vehicle power supply or a start-stop operation of the vehicle prime mover. The vehicle control device 300 also has a function to accept (permit) the above-described operation when the authentication of the mobile device has succeeded. In this embodiment, the key unit 100, instead of the mobile device possessed by the owner, performs transmission and reception of RF-band and LF-band electromagnetic waves to and from the vehicle control device 300, thereby controlling various operations of the vehicle 10. Hereinafter, unless otherwise noted, the vehicle control device 300 performs communication with the key unit 100.

Herein, specific configurations of the vehicle control device 300 and the key unit 100 will be described. In this embodiment, an example will be given where an internal combustion engine (engine) is installed as the prime mover of the vehicle 10. The vehicle control device 300 includes an LF transmitter 301, an RF receiver 302, a collation ECU 303, a body ECU 304, a door lock actuator 305, an engine ECU 306, an engine 307, and an ignition switch 308. The LF transmitter 301 is a means that transmits electromagnetic waves in a low frequency band (e.g. 100 KHz to 300 KHz) for polling the key unit 100. The LF transmitter 301 is built in, for example, near a center console or a steering wheel in a vehicle cabin. The RF receiver 302 is a means that receives electromagnetic waves in a radio frequency band (e.g. 100 MHz to 1 GHz) transmitted from the key unit 100. The RF receiver 302 is built in at any place in the vehicle cabin.

The collation ECU 303 is a computer that controls locking and unlocking of the doors of the vehicle 10 based on a signal (a locking signal or an unlocking signal) transmitted via RF-band electromagnetic waves from the key unit 100. The collation ECU 303 is formed by, for example, a microcomputer. In the following description, a locking signal and an unlocking signal will be collectively referred to as a locking-unlocking signal. The term "locking-unlocking signal" means at least one of a locking signal and an unlocking signal. When an occupant has performed a start-stop operation of the engine 307, the collation ECU 303 performs polling of the key unit 100 using LF-band electromagnetic waves, thereby acquiring a key ID possessed by the key unit 100. The start-stop operation of the engine 307 by the occupant can be performed by, for example, an on-off operation of the ignition switch 308. The collation ECU 303 performs authentication based on the key ID acquired from the key unit 100, and when the authentication has succeeded, the collation ECU 303 accepts the start-stop operation of the engine 307 by the occupant.

The collation ECU 303 authenticates that a locking-unlocking signal transmitted from the key unit 100 has been transmitted from the legitimate device. Specifically, the collation ECU 303 determines whether or not a key ID included in the locking-unlocking signal coincides with a key ID stored in advance in a storage unit of the collation ECU 303. Then, based on the authentication result, the collation ECU 303 transmits an unlocking command or a locking command to the body ECU 304. This unlocking command or locking command is transmitted via an in-vehicle network such as a controller area network (CAN).

The door lock actuator 305 is an actuator that locks and unlocks the doors of the vehicle 10. The doors of the vehicle 10 include vehicle cabin doors that are opened and closed when getting into and out of the vehicle cabin serving as a boarding space, a luggage compartment door that is opened and closed when loading and unloading the luggage into and from a luggage compartment, and so on. The door lock actuator 305 operates based on a signal transmitted from the body ECU 304. The door lock actuator 305 may be configured to be capable of locking and unlocking the vehicle cabin doors and the luggage compartment door of the vehicle 10 independently of each other.

The body ECU 304 is a computer that performs body control of the vehicle 10. The body ECU 304 controls the door lock actuator 305 based on the unlocking command or the locking command received from the collation ECU 303, thereby unlocking or locking the vehicle cabin doors and the luggage compartment door of the vehicle 10.

The engine 307 includes an engine body for driving drive wheels of the vehicle 10, a starter motor for starting the engine body, relays for switching supply and stop of electric power to electrical components (fuel injection valves, spark plugs, etc.) attached to the engine body, and so on.

The ignition switch 308 is a switch that is operated by an occupant when starting or stopping the engine 307 of the vehicle 10. The ignition switch 308 is disposed, for example, near the center console or the steering wheel in the vehicle cabin. When an start-stop operation of the engine 307 by the ignition switch 308 is performed, the collation ECU 303 transmits a transmission request for a key ID to the key unit 100 via the LF transmitter 301. In this case, as will be described later, the key unit 100 performs authentication of the user terminal 200, and when the authentication has succeeded, the key unit 100 transmits the key ID possessed by the key unit 100 to the OBU. When the key ID transmitted from the key unit 100 is received by the RF receiver 302, the collation ECU 303 performs authentication of the key ID, and when the authentication has succeeded, the collation ECU 303 transmits a start command or a stop command for the engine 307 to the engine ECU 306.

The engine ECU 306 is a computer that controls the start and stop of the engine 307, and so on. The engine ECU 306 has a function to control the engine 307 based on the start command or the stop command received from the collation ECU 303, thereby starting or stopping the engine 307.

Next, the key unit 100 will be described. The key unit 100 is a device that is disposed at a predetermined position (e.g. in a glove box) in the vehicle cabin of the vehicle 10. The key unit 100 performs authentication of the user terminal 200 by performing short-range wireless communication with the user terminal 200, and when the authentication has succeeded, the key unit 100 transmits a locking-unlocking signal using RF-band electromagnetic waves. Further, upon receipt of the key ID transmission request that is transmitted from the vehicle control device 300 using LF-band electromagnetic waves, the key unit 100 performs short-range wireless communication with the user terminal 200, thereby performing authentication of the user terminal 200. Then, when the authentication has succeeded, the key unit 100 transmits the key ID possessed by the key unit 100 to the vehicle control device 300 using RF-band electromagnetic waves. The key unit 100 having such various functions includes an LF receiver 101, an RF transmitter 102, a short-range communication unit 103, and a control unit 104.

The LF receiver 101 is a means that receives a polling signal transmitted via LF-band electromagnetic waves from the vehicle control device 300. The LF receiver 101 has an antenna for receiving LF-band electromagnetic waves (hereinafter referred to as an "LF antenna"). The RF transmitter 102 is a means that transmits a locking-unlocking signal and a key ID via RF-band electromagnetic waves to the vehicle control device 300.

The short-range communication unit 103 is a means that performs communication with the user terminal 200. The short-range communication unit 103 performs communication in a short distance using a predetermined wireless communication standard. The short distance means a distance such that communication can be performed between the vehicle cabin inside and the vehicle cabin outside. In this embodiment, the short-range communication unit 103 performs data communication using the Bluetooth (registered trademark) Low Energy standard (hereinafter referred to as "BLE"). BLE is a low-power communication standard by Bluetooth (registered trademark) and has the feature that pairing of devices is not required so that communication can be started immediately by detecting a communication partner. Although BLE is given as an example in this embodiment, other wireless communication standards can alternatively be used. For example, it is possible to use Near Field Communication (NFC), Ultra-Wideband (UWB), or WiFi (registered trademark).

The control unit 104 is a computer that performs short-range wireless communication with the user terminal 200 via the short-range communication unit 103 and performs a process of authenticating the user terminal 200 and a process of transmitting a locking-unlocking signal and a key ID based on the authentication result. The control unit 104 is formed by, for example, a microcomputer.

Figure 3:
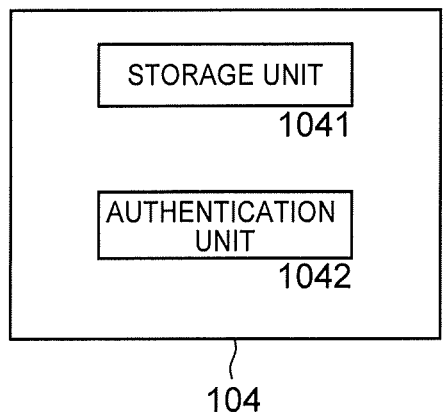
FIG. 3 is a diagram showing an example of a functional module included in a control unit of a key unit.

FIG. 3 shows a functional module included in the control unit 104. As shown in FIG. 3, the control unit 104 includes a storage unit 1041 and an authentication unit 1042. A control program for controlling the key unit 100 is stored in the storage unit 1041. The control unit 104 can realize various functions including the authentication unit 1042 by executing the control program stored in the storage unit 1041 using CPU (not shown). For example, the control unit 104 realizes a function to receive, via the LF receiver 101, a polling signal transmitted as LF-band electromagnetic waves from the vehicle control device 300, a function to transmit a locking-unlocking signal and a key ID as RF-band electromagnetic waves to the vehicle control device 300 via the RF transmitter 102, a function to process communication with the user terminal 200 that is performed via the short-range communication unit 103, and a function to produce a locking-unlocking signal and a key ID when authentication of the user terminal 200 by the authentication unit 1042 has succeeded.

The authentication unit 1042 performs authentication of the user terminal 200 based on authentication information that is received from the user terminal 200. Specifically, the authentication unit 1042 compares between authentication information stored in the storage unit 1041 (authentication information unique to the key unit 100) and authentication information received from the user terminal 200, and when they coincide with each other, the authentication unit 1042 determines that the authentication has succeeded. On the other hand, when the stored authentication information and the received authentication information do not coincide with each other, the authentication unit 1042 determines that the authentication has failed.

Herein, when a locking request or an unlocking request (hereinafter collectively referred to as a "locking-unlocking request") from the user terminal 200 is received by the short-range communication unit 103, the authentication unit 1042 performs authentication of the user terminal 200 based on authentication information attached to the locking-unlocking request. When the authentication has succeeded, the authentication unit 1042 produces a locking-unlocking signal according to the request received from the user terminal 200. Then, the authentication unit 1042 transmits the produced locking-unlocking signal to the vehicle control device 300 via the RF transmitter 102. In this event, an authentication method that is performed by the authentication unit 1042 may be a method that verifies the identity by simply comparing the stored authentication information and the received authentication information with each other, or may be a method using asymmetric cryptography. Hereinafter, where appropriate for description, authentication information that is stored in the storage unit 1041 of the key unit 100 will be referred to as "device authentication information", and authentication information that is transmitted from the user terminal 200 will be referred to as "terminal authentication information". Terminal authentication information is one example of "predetermined authentication information" in the present disclosure.

When transmitting the locking-unlocking signal to the vehicle control device 300, the authentication unit 1042 attaches an ID of an electronic key (a key ID) to the locking-unlocking signal. The key ID referred to herein may be stored in plaintext in the key unit 100 in advance, or may be stored in a state encrypted with a code unique to the user terminal 200. When the key ID is stored in the encrypted state, the encrypted key ID may be decrypted using the terminal authentication information transmitted from the user terminal 200 so as to obtain the original key ID.

When the key ID transmission request from the vehicle control device 300 is received by the LF receiver 101, the authentication unit 1042 performs short-range wireless communication with the user terminal 200 via the short-range communication unit 103, thereby acquiring the terminal authentication information possessed by the user terminal 200. Then, the authentication unit 1042 performs authentication of the user terminal 200 based on the terminal authentication information acquired from the user terminal 200, and when the authentication has succeeded, the authentication unit 1042 transmits the key ID possessed by the key unit 100 from the RF transmitter 102 to the vehicle control device 300.

When the user has performed a start-stop operation of the engine 307 using the user terminal 200 instead of operating the ignition switch 308, the authentication unit 1042 performs authentication of the user terminal 200 in the same sequence as that upon receipt of a locking-unlocking request from the user terminal 200. Then, when the authentication has succeeded, the authentication unit 1042 produces a start command signal or a stop command signal for the engine 307 and transmits the produced start command signal or stop command signal and the key ID to the vehicle control device 300. In this case, the vehicle control device 300 performs authentication in the same sequence as that upon receipt of a locking command signal or an unlocking command signal from the key unit 100, and when the authentication has succeeded, the vehicle control device 300 transmits a start command or a stop command for the engine 307 to the engine ECU 306.

User Terminal

Next, the user terminal 200 will be described. As described above, the user terminal 200 is a terminal that is carried by a user to be a borrower of the vehicle 10. The user terminal 200 is, for example, a small computer such as a smartphone, a mobile phone, a tablet terminal, a personal information terminal, or a wearable computer (smartwatch or the like). The user terminal 200 includes a short-range communication unit 201, a communication unit 202, a control unit 203, an input-output unit 204, and a camera 205.

The short-range communication unit 201 is a means that performs communication with the key unit 100 using the same communication standard as the short-range communication unit 103 of the key unit 100. The communication unit 202 is a communication means for connecting the user terminal 200 to a network. In this embodiment, the user terminal 200 can communicate with other devices via the network using the mobile communication service such as 3rd Generation (3G) or Long Term Evolution (LTE). The other devices are, for example, the lending-borrowing management server device 400 and the center server device 500.

The control unit 203 is a computer that controls the user terminal 200. The control unit 203 performs, for example, a process of acquiring terminal authentication information, a process of producing a locking-unlocking request, and a process of transmitting the terminal authentication information and the locking-unlocking request to the key unit 100. The control unit 203 is formed by, for example, a microcomputer and realizes the various processes described above by causing CPU (not shown) to execute a program stored in a storage unit (ROM or the like) (not shown).

The control unit 203 performs interaction with the user via the input-output unit 204. The input-output unit 204 is a means that accepts an input operation performed by the user and presents information to the user. Specifically, the input-output unit 204 includes a touch panel and its control unit, and a liquid crystal display and its control unit. In this embodiment, the touch panel and the liquid crystal display are formed by a single touch panel display.

The control unit 203 displays an operation screen on the input-output unit 204 and produces a locking-unlocking request according to an operation performed by the user. For example, the control unit 203 outputs an icon for unlocking and an icon for locking on the touch panel display and produces an unlocking request or a locking request based on an operation performed by the user. An operation that the user performs is not limited to one via the touch panel display. For example, it may be one using a hardware switch.

Further, the control unit 203 performs a process of acquiring terminal authentication information (predetermined authentication information) from the center server device 500. Terminal authentication information is not information (key ID) for authenticating the key unit 100 by the vehicle control device 300, but is information for authenticating the user terminal 200 by the key unit 100. The information for authenticating the user terminal 200 is, for example, information associated with device authentication information unique to the key unit 100. Specifically, the control unit 203 transmits a signal for requesting use of the vehicle 10 (a use request signal) to the lending-borrowing management server device 400 via the communication unit 202. Terminal identification information for identifying the user terminal 200 is attached to a "use request signal" referred to herein. Based on the terminal identification information attached to the use request signal, the lending-borrowing management server device 400 having received the use request signal determines whether or not the use request signal has been transmitted from the legitimate terminal. Then, when the lending-borrowing management server device 400 has determined that the use request signal has been transmitted from the legitimate terminal, the lending-borrowing management server device 400 transmits to the user terminal 200 an image request signal that is a signal for requesting capturing an image of a face of the user and requesting transmission of a captured image (user face image). When the image request signal from the lending-borrowing management server device 400 is received by the communication unit 202, the control unit 203 operates the camera 205 so as to prompt the user to capture an image of the user's own face. The camera 205 referred to herein may be one that captures a still image, or one that captures a moving image. Then, when the user has performed a face image capturing operation using the camera 205, the control unit 203 transmits data of a user face image captured by the camera 205 to the lending-borrowing management server device 400 via the communication unit 202. When the data of the user face image transmitted from the user terminal 200 is received by the lending-borrowing management server device 400, the lending-borrowing management server device 400 transmits the user face image along with a signal for requesting a use permission of the vehicle 10 (a use permission request signal) to the owner terminal 600 of an owner to be a lender of the vehicle 10. The user face image that the lending-borrowing management server device 400 has received from the user terminal 200 is attached to a "use permission request signal" referred to herein. In this case, the owner can determine whether or not to permit use of the vehicle 10 by the user by reference to the user face image. The user face image is the most recent face image of the user captured after the user terminal 200 has received the image request signal from the lending-borrowing management server device 400. Then, when a signal that does not permit use of the vehicle 10 (a use non-permission signal) is transmitted from the owner terminal 600 to the lending-borrowing management server device 400 in response to the use permission request signal, the lending-borrowing management server device 400 transmits to the user terminal 200 a signal indicating that the vehicle 10 is in an unavailable state. On the other hand, when a signal that permits use of the vehicle 10 (a use permission signal) is transmitted from the owner terminal 600 to the lending-borrowing management server device 400 in response to the use permission request signal, the lending-borrowing management server device 400 transmits a signal for requesting issuance of terminal authentication information (an authentication information issuance request signal) to the center server device 500. The center server device 500 having received the authentication information issuance request signal acquires terminal authentication information associated with device authentication information unique to the key unit 100 installed in the vehicle 10 being the rental object. Then, the center server device 500 transmits the acquired terminal authentication information directly to the user terminal 200. Alternatively, the center server device 500 may transmit the acquired terminal authentication information indirectly to the user terminal 200 via the lending-borrowing management server device 400. When the user terminal 200 has received the terminal authentication information, the user can perform an unlocking operation, a locking operation, an engine start operation, an engine stop operation, and so on for the vehicle 10 using the user terminal 200. When the user terminal 200 does not have the terminal authentication information, it is impossible for the user to operate the vehicle 10 using the user terminal 200.

In this embodiment, the terminal authentication information that is acquired by the user terminal 200 is a one-time key that is invalidated when the use of the vehicle 10 by the user has ended. For example, at timing when terminal authentication information transmitted from the center server device 500 is received by the user terminal 200, the terminal authentication information is stored in a storage unit (not shown) of the user terminal 200. Thereafter, the terminal authentication information is deleted from the storage unit at timing when a use end notification is transmitted from the user terminal 200 to the lending-borrowing management server device 400. The timing when the terminal authentication information stored in the storage unit of the user terminal 200 is deleted is not limited to the example described above. For example, in the case where the vehicle 10 is returned to a predetermined position and locking of the vehicle 10 is completed before the end of the use period, the terminal authentication information may be deleted from the storage unit at timing when the use period ends.

Lending-Borrowing Management Server Device

Next, the lending-borrowing management server device 400 will be described. The lending-borrowing management server device 400 is a computer including a processor (not shown) such as a central processing unit (CPU) or a digital signal processor (DSP), a main storage unit (not shown) such as a random-access memory (RAM) and a read-only memory (ROM), and an auxiliary storage unit (not shown) such as an erasable programmable ROM (EPROM), a hard disk drive (HDD), or removable media. The removable media is, for example, a universal serial bus (USB) memory or a disc storage medium such as a compact disc (CD) or a digital versatile disc (DVD). An operating system (OS), various programs, various tables, and so on are stored in the auxiliary storage unit. The programs stored in the auxiliary storage unit are loaded into the working area of the main storage unit and executed so that respective components and so on are controlled through the execution of the programs, thereby realizing respective functions.

The lending-borrowing management server device 400 includes a communication unit 402. The communication unit 402 is a communication means for connecting the lending-borrowing management server device 400 to a network. For example, the communication unit 402 communicates with the center server device 500 via the network using the communication network such as Local Area Network (LAN), Wide Area Network (WAN), or WiFi (registered trademark), and communicates with the user terminal 200 and the owner terminal 600 via the network using the mobile communication service described above.

The lending-borrowing management server device 400 includes a lending-borrowing management database (lending-borrowing management DB) 403. The lending-borrowing management DB 403 is formed such that lending-borrowing information of the vehicle 10 is stored in the auxiliary storage unit. In the lending-borrowing management DB 403, identification information of a user to be a borrower of the vehicle 10 and the lending-borrowing information are associated with each other. The lending-borrowing management DB 403 is constructed such that the program of a database management system (DBMS) that is executed by the processor manages data that is stored in the auxiliary storage unit. The lending-borrowing management DB 403 is, for example, a relational database.

Herein, one configuration example of lending-borrowing information that is stored in the lending-borrowing management DB 403 will be described with reference to FIG. 4. FIG. 4 is a diagram showing an example of a table configuration of lending-borrowing information. The lending-borrowing information table shown in FIG. 4 has fields such as a user ID field, a use period field, an owner ID field, and a status field. User identification information for identifying a user to be a borrower of the vehicle 10 is input into the user ID field. The user ID referred to herein is information that is assigned to a user when the user registers for membership of the car sharing service. Information indicative of a use period of the vehicle 10 is input into the use period field. The information indicative of the use period is, for example, information including a use start date and time and a use end date and time. The use period referred to herein is a period that is specified by a user when the user makes a use reservation of the vehicle 10. Owner identification information for identifying an owner of the vehicle 10 to be a rental object to a user is input into the owner ID field. The owner identification information referred to herein is information that is assigned to an owner when the owner registers for membership of the car sharing service. The vehicle 10 to be a rental object to a user is determined such that the user makes a selection from a list of vehicles that are in an available state during a use period that the user wishes. Information indicative of a use status of the vehicle 10 by a user is input into the status field. For example, when use of the vehicle 10 by a user has ended, "end" is input, when a user is using the vehicle 10, "in use" is input, and when it is a reservation stage before the start of use of the vehicle 10 by a user, "reserved" is input. In addition to the various information fields described above, the lending-borrowing information table may have a vehicle information field for inputting a car model, a parking position, and so on of the vehicle 10 to be a rental object.

Vehicle management information associating an owner and an available time of the vehicle 10 with each other is also stored in the lending-borrowing management DB 403.

Herein, one configuration example of vehicle management information that is stored in the lending-borrowing management DB 403 will be described with reference to FIG. 5. FIG. 5 is a diagram showing an example of a table configuration of vehicle management information. The vehicle management information table shown in FIG. 5 has fields such as an owner ID field, a vehicle identification information field, a vehicle position field, and an available time information field. Identification information of an owner to be a lender of the vehicle 10 is input into the owner ID field. Information that is necessary for a user to be a borrower to visually identify the vehicle 10 to be a rental object is registered in the vehicle identification information field. For example, a car model, a color of a vehicle body, and a number plate are registered in the vehicle identification information field. Information indicative of a position where the vehicle 10 is parked is registered in the vehicle position field. The position information of the vehicle 10 is registered based on a request from an owner. In the case where a communication device capable of communicating with the center server device 500 is installed in the vehicle 10, position information of the vehicle 10 that is captured by the center server device 500 via the communication device may be acquired from the center server device 500 and registered in the vehicle position field. Information about date and time at which the vehicle 10 can be used as a rental object is registered in the available time information field. Available time registered in the available time information field is updated as appropriate according to information notified from an owner to be a lender, use time of a user to be a borrower, and so on.

The lending-borrowing management server device 400 includes a control unit 401 that realizes respective functions through the execution of the program by the processor. The control unit 401 performs management control such as registration and updating of lending-borrowing information and vehicle management information in the lending-borrowing management DB 403. For example, when a use reservation from a user to be a borrower has occurred, the control unit 401 associates a use period, owner identification information of an owner to be a lender, and so on with user identification information of the user so as to produce lending-borrowing information corresponding to the user. The control unit 401 registers the produced lending-borrowing information in the lending-borrowing management DB 403. Along with this, the control unit 401 updates available time information associated with the owner identification information in vehicle management information. When a change request for the use period or the like has occurred from the user after the lending-borrowing information is registered in the lending-borrowing management DB 403, the control unit 401 updates the registration content of the lending-borrowing management DB 403 according to the change request. Further, the control unit 401 also updates information about the status by communicating with the user terminal 200 via the communication unit 402.

In this embodiment, when a use request signal transmitted from the user terminal 200 is received by the communication unit 402, the control unit 401 first determines whether or not the use request signal has been transmitted from the legitimate user terminal 200, based on terminal identification information attached to the use request signal. For example, the control unit 401 collates the terminal identification information received from the user terminal 200 with identification information of the terminal used when performing a use reservation of the vehicle 10 or registered, and when the collation has succeeded, the control unit 401 determines that the use request signal has been transmitted from the legitimate terminal. In this case, the control unit 401 communicates with the user terminal 200 and the owner terminal 600 via the communication unit 402, thereby confirming whether or not the vehicle 10 can be used. Specifically, the control unit 401 first transmits an image request signal to the user terminal 200. When user face image data transmitted from the user terminal 200 in response to the image request signal is received by the communication unit 402, the control unit 401 transmits a use permission request signal attached with the user face image data to the owner terminal 600 via the communication unit 402. When the owner terminal 600 has received the use permission request signal attached with the user face image data, the owner can determine whether or not to permit use of the vehicle 10 by the user by reference to the user face image. The user face image is the most recent face image of the user captured after the user terminal 200 has received the image request signal from the lending-borrowing management server device 400. Then, when the owner has determined not to permit use of the vehicle 10 by the user, the owner operates the owner terminal 600 so as to transmit a use non-permission signal to the lending-borrowing management server device 400. On the other hand, when the owner has determined to permit use of the vehicle 10 by the user, the owner operates the owner terminal 600 so as to transmit a use permission signal to the lending-borrowing management server device 400. When the signal transmitted from the owner terminal 600 to the lending-borrowing management server device 400 in response to the use permission request is the use non-permission signal, the control unit 401 transmits a signal indicating that the vehicle 10 is in an unavailable state, to the user terminal 200 via the communication unit 402. In this case, an authentication information issuance request from the lending-borrowing management server device 400 to the center server device 500 and issuance of terminal authentication information from the center server device 500 to the user terminal 200 are not performed. When the issuance of the terminal authentication information is not performed, it is impossible to operate the vehicle 10 using the user terminal 200 so that use of the vehicle 10 by the user is made impossible. On the other hand, when the signal transmitted from the owner terminal 600 to the lending-borrowing management server device 400 in response to the use permission request is the use permission signal, the control unit 401 transmits an authentication information issuance request signal to the center server device 500 via the communication unit 402. In this event, owner identification information of the owner to be the lender of the vehicle 10 is attached to the authentication information issuance request signal. When the center server device 500 has received the authentication information issuance request signal, the center server device 500 identifies the vehicle 10 to be a rental object based on the owner identification information attached to the authentication information issuance request signal. Further, the center server device 500 acquires terminal authentication information associated with device authentication information unique to the key unit 100 installed in the identified vehicle 10. Then, the center server device 500 transmits the acquired terminal authentication information directly to the user terminal 200 or indirectly to the user terminal 200 via the lending-borrowing management server device 400. After the terminal authentication information is transmitted to the user terminal 200, it is possible to operate the vehicle 10 using the user terminal 200 so that use of the vehicle 10 by the user is made possible.

The lending-borrowing management server device 400 may have a function to perform a billing process to a user according to a use period of a vehicle by the user. The billing process may be performed by a server device other than the lending-borrowing management server device 400.

Herein, part of the functional components of the lending-borrowing management server device 400 or part of the processing thereof may be performed by another computer that is connected to the lending-borrowing management server device 400 via a network. A series of processes that are performed by the lending-borrowing management server device 400 can be performed by hardware or software.

Center Server Device

Next, the center server device 500 will be described. The center server device 500 also has the general computer configuration. The basic hardware configuration is the same as that of the lending-borrowing management server device 400 and includes a processor (not shown), a main storage unit (not shown), and an auxiliary storage unit (not shown). Therefore, programs stored in the auxiliary storage unit are loaded into the working area of the main storage unit and executed so that respective components and so on are controlled through the execution of the programs, thereby realizing respective functions. The center server device 500 includes a communication unit 502. The communication unit 502 is functionally equivalent to the communication unit 402 of the lending-borrowing management server device 400. The communication unit 502 performs communication between the center server device 500 and other devices (the lending-borrowing management server device 400 etc.).

The center server device 500 includes, in the auxiliary storage unit, an owner information database (owner information DB) 503 and an authentication information database (authentication information DB) 504 that store various information. These databases (DBs) are constructed such that the program of a database management system that is executed by the processor manages data that is stored in the auxiliary storage unit. The owner information DB 503 and the authentication information DB 504 are, for example, relational databases.

In the owner information DB 503, owner identification information for identifying an owner to be a lender of the vehicle 10 and owner vehicle identification information for identifying the vehicle 10, of which the owner has the right of possession, are stored so as to be associated with each other. As owner identification information that is registered in the owner information DB 503, identification information that is the same as identification information (owner ID) that is used in the lending-borrowing management DB 403 of the lending-borrowing management server device 400 is used.

In the authentication information DB 504, owner vehicle identification information for identifying the vehicle 10, device authentication information unique to the key unit 100 installed in the vehicle 10, and terminal authentication information associated with the device authentication information are stored so as to be associated with each other. The authentication information DB 504 may also store information such as a valid period of terminal authentication information or valid/invalid of terminal authentication information. The valid period of the terminal authentication information may be set to the same period as a use period of the vehicle 10 by a user. Information about a valid period of terminal authentication information may be transmitted to the user terminal 200 along with terminal authentication information when the terminal authentication information is transmitted to the user terminal 200. In this case, as described above, the user terminal 200 may invalidate the terminal authentication information by deleting the terminal authentication information stored in the storage unit of the user terminal 200 when the valid period has elapsed from the use start timing of the vehicle 10.

The center server device 500 includes a control unit 501 that realizes respective functions through the execution of the program by the processor. The control unit 501 performs control relating to issuance of authentication information to the user terminal 200 or the like. Specifically, when an authentication information issuance request transmitted from the lending-borrowing management server device 400 is received by the communication unit 502, the control unit 501 accesses the owner information DB 503 to derive owner vehicle identification information corresponding to owner identification information attached to the authentication information issuance request. Subsequently, the control unit 501 accesses the authentication information DB 504 to derive terminal authentication information corresponding to the owner vehicle identification information derived from the owner information DB 503. Then, the control unit 501 transmits the terminal authentication information (and information about a valid period) derived from the authentication information DB 504 to the user terminal 200 via the communication unit 502. In this event, the terminal authentication information may be transmitted directly to the user terminal 200 or indirectly to the user terminal 200 via the lending-borrowing management server device 400.

Herein, part of the functional components of the center server device 500 or part of the processing thereof may be performed by another computer that is connected to the center server device 500 via a network. A series of processes that are performed by the center server device 500 can be performed by hardware or software.

Owner Terminal

Next, the owner terminal 600 will be described. The owner terminal 600 may be, like the user terminal 200, a small computer such as a smartphone, a mobile phone, a tablet terminal, a personal information terminal, or a wearable computer (smartwatch or the like), or may be a stationary personal computer. The owner terminal 600 includes a communication unit 601, a control unit 602, and an input-output unit 603.

Like the communication unit 202 of the user terminal 200, the communication unit 601 is a communication means for connecting the owner terminal 600 to a network and can communicate with other devices (the lending-borrowing management server device 400, the center server device 500, etc.) via the network using the mobile communication service such as 3G or LTE.

The control unit 602 is a computer that controls the owner terminal 600. Upon receipt of a use permission request signal from the lending-borrowing management server device 400, the control unit 602 performs processes such as a process of prompting the owner to select whether or not to permit use of the vehicle 10 by a user, and a process of transmitting to the lending-borrowing management server device 400 a use permission signal or a use non-permission signal according to permission or non-permission selected by the owner. The control unit 602 is formed by, for example, a microcomputer and realizes the various processes described above by causing CPU (not shown) to execute a program stored in a storage unit (ROM or the like) (not shown).

The control unit 602 performs interaction with the owner via the input-output unit 603. The input-output unit 603 is a means that accepts an input operation performed by the owner and presents information to the owner. For example, the input-output unit 603 includes a touch panel and its control unit, and a liquid crystal display and its control unit. When the use permission request signal transmitted from the lending-borrowing management server device 400 is received by the communication unit 601, the control unit 602 displays on the input-output unit 603 a user face image attached to the use permission request signal and an operation screen for allowing the owner to input information as to whether or not to permit use of the vehicle 10 by the user. By displaying such an operation screen, the control unit 602 prompts the owner to select whether or not to permit use of the vehicle 10 by the user. For example, the control unit 602 displays the user face image and further displays a permission button and a non-permission button on the touch panel display. When an operation of the permission button or an operation of the non-permission button by the owner is performed on the operation screen, the control unit 602 produces a use permission signal or a use non-permission signal according to the operated button and transmits the produced use permission signal or use non-permission signal to the lending-borrowing management server device 400 via the communication unit 601.

In FIG. 2, the owner terminal 600 does not explicitly include a configuration corresponding to the short-range communication unit 201 of the user terminal 200. However, the owner terminal 600 may include such a configuration and may be configured to acquire terminal authentication information in the same sequence as the user terminal 200 and transmit the acquired terminal authentication information to the key unit 100 by short-range wireless communication, thereby making it possible to operate the vehicle 10.

Operation of System

Herein, the operation of the car sharing system when a user uses the vehicle 10 will be described with reference to FIG. 6. FIG. 6 is a flow diagram for explaining the flow of data that are transmitted and received between the respective components, and the processes that are performed by the respective components. In the flow diagram shown in FIG. 6, it is assumed that a use reservation by a user to be a borrower has already been completed. Further, it is assumed that the process of transmission of a use request signal from the user terminal 200 is performed just before the start of a use period.

First, when a user having completed a use reservation of the vehicle 10 has performed an operation of transmitting a use request signal via the input-output unit 204 of the user terminal 200 just before the start of a use period, the user terminal 200 transmits the use request signal along with identification information of the user terminal 200 to the lending-borrowing management server device 400 at step S11.

When the terminal identification information and the use request signal transmitted from the user terminal 200 are received by the lending-borrowing management server device 400, the lending-borrowing management server device 400 determines based on the terminal identification information whether or not the use request signal has been transmitted from the legitimate terminal. When the lending-borrowing management server device 400 has determined that the use request signal has been transmitted from the legitimate terminal, the lending-borrowing management server device 400 transmits an image request signal to the user terminal 200 at step S12. The lending-borrowing management server device 400 executing step S12 is an example of the "an image request device".

When the image request signal transmitted from the lending-borrowing management server device 400 is received by the user terminal 200, the user terminal 200 operates the camera 205 so as to prompt the user to capture an image of the user's own face. When the user has captured the image of the user's own face using the camera 205, the user terminal 200 transmits data of the user face image captured by the camera 205 to the lending-borrowing management server device 400 at step S13.

When the user face image data transmitted from the user terminal 200 is received by the lending-borrowing management server device 400, the lending-borrowing management server device 400 transmits the user face image data and a use permission request signal to the owner terminal 600 at step S14. The lending-borrowing management server device 400 executing step S14 is an example of the "a use permission request device".

When the use permission request signal transmitted from the lending-borrowing management server device 400 is received by the owner terminal 600, the owner terminal 600 displays on the input-output unit 603 the user face image attached to the use permission request signal and an operation screen for allowing the owner to input information as to whether or not to permit use of the vehicle 10 by the user. Consequently, the owner is prompted to select whether or not to permit use of the vehicle 10 by the user. In this event, the owner can determine whether or not to permit use of the vehicle 10 by the user by reference to the user face image captured most recently. Then, when the owner has performed an operation for selecting whether or not to permit use of the vehicle 10 by the user, the owner terminal 600 produces a use permission signal or a use non-permission signal according to the selection of the owner at step S15. The owner terminal 600 transmits the produced use permission signal or use non-permission signal to the lending-borrowing management server device 400.

Herein, when the use permission signal or the use non-permission signal transmitted from the owner terminal 600 is received by the lending-borrowing management server device 400, the lending-borrowing management server device 400 determines whether the signal is the use permission signal or the use non-permission signal. In this event, when the signal received from the owner terminal 600 is the use non-permission signal, the lending-borrowing management server device 400 does not perform an authentication information issuance request to the center server device 500. Then, the lending-borrowing management server device 400 transmits to the user terminal 200 a signal indicating that the vehicle 10 is in an unavailable state. When the signal received from the owner terminal 600 is the use permission signal, the lending-borrowing management server device 400 transmits an authentication information issuance request signal to the center server device 500 at step S16.

When the authentication information issuance request signal transmitted from the lending-borrowing management server device 400 is received by the center server device 500, the center server device 500 derives, based on owner identification information attached to the authentication information issuance request signal, owner vehicle identification information corresponding to the owner identification information. Subsequently, based on the owner vehicle identification information, the center server device 500 acquires terminal authentication information associated with device authentication information unique to the key unit 100 installed in the vehicle 10 (step S17). Then, the center server device 500 transmits the terminal authentication information acquired at step S17 to the user terminal 200 (step S18). The center server device 500 executing step S18 is an example of "an authentication information issue device". The terminal authentication information acquired by the center server device 500 may be transmitted to the user terminal 200 from the center server device 500 via the lending-borrowing management server device 400. When the terminal authentication information transmitted from the center server device 500 in this way is received by the user terminal 200, the terminal authentication information is stored in the storage unit of the user terminal 200. As a result, it is possible to operate the vehicle 10 using the user terminal 200 so that the user can use the vehicle 10.

Next, at steps S21 to S24, the processes for unlocking the doors of the vehicle 10 using the user terminal 200 are performed. It is assumed that when the processes of steps S21 to S24 are performed, the user having referred to vehicle identification information, vehicle position information, and so on has moved the user terminal 200 to a position where short-range wireless communication between the key unit 100 of the vehicle 10 and the user terminal 200 can be established.

When the user has performed an operation for unlocking the vehicle 10 via the input-output unit 204 of the user terminal 200, the user terminal 200, at step S21, transmits the terminal authentication information and an unlocking request to the key unit 100 using short-range wireless communication. Then, when the terminal authentication information and the unlocking request transmitted from the user terminal 200 are received by the key unit 100, the key unit 100, at step S22, performs authentication of the user terminal 200 by collating the terminal authentication information received from the user terminal 200 with device authentication information stored in advance in the key unit 100. When the collation between the terminal authentication information and the device authentication information has succeeded so that the authentication of the user terminal 200 has succeeded, the key unit 100, at step S23, transmits an unlocking signal and a key ID to the vehicle control device 300 using RF-band electromagnetic waves. When the unlocking signal and the key ID transmitted from the key unit 100 are received by the vehicle control device 300, the vehicle control device 300, at step S24, performs authentication of the key unit 100 based on the key ID received from the key unit 100. That is, the vehicle control device 300 collates the key ID received from the key unit 100 with a key ID stored in advance in the vehicle control device 300. When this collation has succeeded so that the authentication of the key unit 100 has succeeded, the vehicle control device 300 unlocks the doors of the vehicle 10. In this event, the vehicle control device 300 may perform a process such as answerback. When the doors of the vehicle 10 are unlocked in this way, the user can get into the vehicle cabin (e.g. the driver's seat) of the vehicle 10.

Next, at steps S201 to S205, the processes for starting the engine of the vehicle 10 using the user terminal 200 are performed. It is assumed that when the processes of steps S201 to S205 are performed, the user terminal 200 is moved in the vehicle cabin of the vehicle 10 along with the user.

When the user getting into the vehicle cabin of the vehicle 10 has performed an operation for turning on the ignition switch 308, the vehicle control device 300, at step S201, transmits a key ID transmission request signal to the key unit 100 using LF-band electromagnetic waves. When the key ID transmission request signal transmitted from the vehicle control device 300 is received by the key unit 100, the key unit 100, at step S202, transmits a terminal authentication information request signal, being a signal for requesting transmission of terminal authentication information, to the user terminal 200 using short-range wireless communication. When the terminal authentication information request signal transmitted from the key unit 100 is received by the user terminal 200, the user terminal 200, at step S203, transmits the terminal authentication information stored in the storage unit of the user terminal 200 to the key unit 100 using short-range wireless communication. When the terminal authentication information transmitted from the user terminal 200 is received by the key unit 100, the key unit 100, at step S204, performs authentication of the user terminal 200 by collating the terminal authentication information received from the user terminal 200 with the device authentication information stored in advance in the key unit 100. When the collation between the terminal authentication information and the device authentication information has succeeded so that the authentication of the user terminal 200 has succeeded, the key unit 100, at step S205, transmits the key ID possessed by the key unit 100 to the vehicle control device 300 using RF-band electromagnetic waves. When the key ID transmitted from the key unit 100 is received by the vehicle control device 300, the vehicle control device 300, at step S206, performs authentication of the key unit 100 based on the received key ID and starts the engine 307 when the authentication of the key unit 100 has succeeded.

Although not explicitly shown in FIG. 6, when the user has performed an operation for turning off the ignition switch 308 for the purpose of stopping the operation of the engine 307, the process for authentication of the user terminal 200 by the key unit 100 and the process for authentication of the key unit 100 by the vehicle control device 300 are performed like in the case of starting the engine 307, and when those authentications have succeeded, the vehicle control device 300 stops the engine 307.

At steps S31 to S37, the processes for locking the vehicle 10 using the user terminal 200 at the end of use of the vehicle 10 by the user are performed. When the user has performed an operation for locking the vehicle 10 via the input-output unit 204 of the user terminal 200 with the doors of the vehicle 10 closed after the use of the vehicle 10 by the user has ended, the user terminal 200, at step S31, transmits the terminal authentication information and a locking request to the key unit 100 using short-range wireless communication. When the terminal authentication information and the locking request transmitted from the user terminal 200 are received by the key unit 100, the key unit 100, at step S32, performs authentication of the user terminal 200 based on the terminal authentication information received from the user terminal 200. When the authentication of the user terminal 200 has succeeded, the key unit 100, at step S33, transmits a locking signal and the key ID to the vehicle control device 300 using RF-band electromagnetic waves. When the locking signal and the key ID transmitted from the key unit 100 are received by the vehicle control device 300, the vehicle control device 300, at step S34, performs authentication of the key unit 100 based on the key ID received from the key unit 100. When the authentication of the key unit 100 has succeeded, the vehicle control device 300 locks the doors of the vehicle 10. After transmitting the locking signal to the vehicle control device 300, the key unit 100 transmits a notification indicating that locking of the vehicle 10 has been completed (a locking notification) to the user terminal 200 using short-range wireless communication (step S35). Consequently, a notification indicative of the completion of locking is output on the touch panel display of the user terminal 200. Then, when the user has performed an operation for ending the use of the vehicle 10 via the input-output unit 204 of the user terminal 200, the user terminal 200, at step S36, produces a use end notification signal being a signal for notifying that the use of the vehicle 10 has ended, and transmits the produced use end notification signal to the lending-borrowing management server device 400 using the mobile communication service. Along with this, the user terminal 200 invalidates the terminal authentication information by deleting the terminal authentication information stored in the storage unit of the user terminal 200. Consequently, it is impossible to operate the vehicle 10 using the user terminal 200. When the use end notification signal transmitted from the user terminal 200 is received by the lending-borrowing management server device 400, the lending-borrowing management server device 400, at step S37, produces a vehicle return signal being a signal indicating that the return of the vehicle 10 following the end of use of the vehicle 10 by the user has been completed, and transmits the produced vehicle return signal to the owner terminal 600 using the mobile communication service. In the case where the use of the vehicle 10 by the user continues even after the locking notification transmitted from the key unit 100 is received by the user terminal 200, i.e. in the case where the user has performed the operation for locking the vehicle 10 during the use period, the user does not necessarily perform the operation for ending the use of the vehicle 10 via the input-output unit 204 of the user terminal 200. In this case, since the processes of steps S36 and S37 are not performed, the operation of the vehicle 10 using the user terminal 200 is continuously enabled.

According to the embodiment described above, when a use request for the vehicle 10 by a user has occurred, an owner to be a lender of the vehicle 10 can determine whether or not to permit use of the vehicle 10 by the user by reference to a user face image captured most recently. Therefore, it is possible to reduce anxiety of the owner at the time when the owner rents out the vehicle 10.

In this embodiment, a determination whether or not to permit use of the vehicle 10 by a user is requested of an owner just before the user starts using the vehicle 10. Alternatively, a determination whether or not to permit use of the vehicle 10 by a user may be requested of an owner when the user makes a use reservation of the vehicle 10.

In this embodiment, the engine 307 is started and stopped such that a user operates the ignition switch 308 installed in the vehicle 10. Alternatively, the engine 307 may be started and stopped such that a start button and a stop button for the engine 307 are displayed on the touch panel display of the user terminal 200 and that a user operates those buttons. In this case, authentication of the user terminal 200 by the key unit 100 may be performed in the same sequence as that when the locking-unlocking operations of the vehicle 10 using the user terminal 200 are performed.

Modified Embodiments

In the above-described embodiment, the processes other than the process relating to acquisition of terminal authentication information and the process relating to issuance of terminal authentication information are performed by the lending-borrowing management server device 400. These processes are, for example, a use reservation of the vehicle 10, an image transmission request to the user terminal 200, a use permission request to the owner terminal 600, a vehicle return notification to the owner terminal 600, and so on. That is, in the above-described embodiment, the two server devices, i.e. the lending-borrowing management server device 400 and the center server device 500, are one example of a "server device" of the present disclosure. On the other hand, when it is configured that all the processes including the process relating to acquisition of terminal authentication information and the process relating to issuance of terminal authentication information are performed by the center server device 500, only the center server device 500 becomes one example of a "server device" of the present disclosure. In this case, when a signal transmitted from the owner terminal 600 in response to a use permission request signal and received by the center server device 500 is a use permission signal, the center server device 500 performs a process of acquiring terminal authentication information and a process of transmitting the acquired terminal authentication information to the user terminal 200.

In the above-described embodiment, the on-board unit includes the key unit and the vehicle control device. However, the on-board unit does not necessarily include the key unit. That is, in the above-described embodiment, the two-step authentication process including the authentication process of terminal authentication information by the key unit and the authentication process of a key ID by the vehicle control device is performed. Alternatively, it may be configured that only the authentication of a key ID by the vehicle control device is performed. In this case, the vehicle control device has a function to directly communicate with the user terminal (e.g. a short-range communication unit). The user terminal acquires a key ID corresponding to the vehicle from the lending-borrowing management server device or the center server device, and the key ID is directly transmitted from the user terminal to the vehicle control device, thereby performing authentication of the key ID by the vehicle control device. In this case, the key ID that the user terminal acquires from the lending-borrowing management server device or the center server device is one example of "predetermined authentication information" of the present disclosure.

In each of the above-described embodiments, terminal authentication information associated with fixed device authentication information unique to the key unit or a key ID corresponding to the vehicle is used as "predetermined authentication information" of the present disclosure. However, "predetermined authentication information" is not limited thereto. For example, when a device capable of communicating with the center server device is installed in the vehicle, the center server device produces new terminal authentication information and transmits the produced new terminal authentication information to the user terminal each time an authentication information issuance request from the lending-borrowing management server device is received. Then, the center server device registers device authentication information corresponding to the produced new terminal authentication information in the key unit via the communication device of the vehicle. In this case, the user terminal transmits the new terminal authentication information received from the center server device to the key unit. Then, the key unit performs authentication of the user terminal by collating the new terminal authentication information received from the user terminal with the new device authentication information registered by the center server device. According to this method, since the predetermined authentication information is changed at every occurrence of a use request for the vehicle, it is possible to enhance the security of the vehicle to be a rental object.

As a method for producing the above-described new terminal authentication information, it is also possible to use a method that produces new terminal authentication information according to an algorithm using key IDs corresponding to the vehicle and time information. In this case, the center server device transmits new terminal authentication information produced by the algorithm to the user terminal along with time information. Then, the user terminal transmits the new terminal authentication information and the time information received from the center server device to the key unit. Using the time information received from the user terminal and key IDs registered in advance in the key unit, the key unit produces device authentication information corresponding to the new terminal authentication information using the same algorithm as the center server device. Then, the key unit performs authentication of the user terminal by collating the terminal authentication information received from the user terminal with the device authentication information produced by the key unit. According to this method, even when the device capable of communicating with the center server device is not installed in the vehicle, it is possible to change the predetermined authentication information each time a use request for the vehicle occurs.

What is claimed is:

1. A server device for managing a service of renting a vehicle from an owner to be a lender of the vehicle to a user to be a borrower of the vehicle, the user capable of using the service by using a user terminal, the owner capable of using the service by using an owner terminal, the server device comprising:
    an image request device configured to transmit an image request signal to the user terminal when a use request signal for the vehicle transmitted from the user terminal is received, the image request signal being a signal for requesting capturing an image of a face of the user and requesting transmission of a user face image being a captured image, and the image of the face of the user being a most recent face image of the user captured after the image request signal has been received by the user terminal;
    a use permission request device configured to transmit a use permission request signal to the owner terminal when the user face image transmitted from the user terminal in response to the image request signal is received, the use permission request signal being a signal including the user face image and information requesting a use permission of the vehicle; and
    an authentication information issue device configured to transmit predetermined authentication information to the user terminal when a use permission signal transmitted from the owner terminal in response to the use permission request signal is received, the authentication information issue device being configured not to transmit predetermined authentication information to the user terminal when a use non-permission signal transmitted from the owner terminal in response to the use permission request signal is received, the use permission signal being a signal for permitting use of the vehicle, the predetermined authentication information being information for enabling an operation of the vehicle, the use non-permission signal being a signal for not permitting use of the vehicle.

2. The server device according to claim 1, wherein
    the vehicle includes an on-board unit configured to accept an operation request for the vehicle from the user terminal,
    the server device is configured to transmit information, that is used by the on-board unit for the authentication of the user terminal, to the user terminal as the predetermined authentication information, when authentication of the user terminal has succeeded.

3. A car sharing system for renting a vehicle from an owner to be a lender of the vehicle to a user to be a borrower of the vehicle, the car sharing system comprising:
    a user terminal that is used by the user, the user terminal configured to transmit a use request signal being a signal for requesting use of the vehicle;
    an owner terminal that is used by the owner; and
    a server device for managing the vehicle, the server device configured to transmit an image request signal to the user terminal when the use request signal from the user terminal is received, communicate with the user terminal to acquire a user face image and transmit the user face image and a use permission request signal to the owner terminal, the owner terminal configured to, when the use permission request signal from the server device is received, transmit a use permission signal or a use non-permission signal to the server device in response to the use permission request signal, the server device configured to, when the use permission signal transmitted from the owner terminal is received, transmit predetermined authentication information for enabling an operation of the vehicle to the user terminal, the server device configured to, when the use non-permission signal transmitted from the owner terminal is received, not transmit the predetermined authentication information to the user terminal, the user face image being a captured image of a face of the user, the use permission request signal being a signal including the user face image and information requesting a use permission of the vehicle, the image of the face of the user being a most recent face image of the user captured by the user terminal after the image request signal has been received by the user terminal, the use permission signal being a signal for permitting use of the vehicle, the use non-permission signal being a signal for not permitting use of the vehicle.

4. An information processing method executed by a computer for a car sharing system, the car sharing system being a system for renting a vehicle from an owner to be a lender of the vehicle to a user to be a borrower of the vehicle, the car sharing system including a user terminal that is used by the user, an owner terminal that is used by the owner, the information processing method comprising:
    transmitting an image request signal to the user terminal when a use request signal for the vehicle transmitted from the user terminal is received, the image request signal being a signal for requesting capturing an image of a face of the user and requesting transmission of a user face image being a captured image, and the image of the face of the user being a most recent face image of the user captured after the image request signal has been received by the user terminal;
    transmitting a use permission request signal to the owner terminal when the user face image transmitted from the user terminal in response to the image request signal is received, the use permission request signal being a signal including the user face image and information requesting a use permission of the vehicle;
    transmitting predetermined authentication information for enabling an operation of the vehicle to the user terminal when a use permission signal transmitted from the owner terminal in response to the use permission request signal is received, the use permission signal being a signal for permitting use of the vehicle; and not transmitting the predetermined authentication information to the user terminal when a use non-permission signal transmitted from the owner terminal in response to the use permission request signal is received, the use non-permission signal being a signal for not permitting use of the vehicle.

5. A non-transitory readable recording medium storing a program that causes a computer to execute a control process for a car sharing system, the car sharing system being a system for renting a vehicle from an owner to be a lender of the vehicle to a user to be a borrower of the vehicle, the car sharing system including a user terminal that is used by the user, an owner terminal that is used by the owner, the control process comprising:

transmitting an image request signal to the user terminal when a use request signal for the vehicle transmitted from the user terminal is received, the image request signal being a signal for requesting capturing an image of a face of the user and requesting transmission of a user face image being a captured image, and the image of the face of the user being a most recent face image of the user captured after the image request signal has been received by the user terminal;

transmitting a use permission request signal to the owner terminal when the user face image transmitted from the user terminal in response to the image request signal is received, the use permission request signal being a signal including the user face image and information requesting a use permission of the vehicle;

transmitting predetermined authentication information for enabling an operation of the vehicle to the user terminal when a use permission signal transmitted from the owner terminal in response to the use permission request signal is received, the use permission signal being a signal for permitting use of the vehicle; and not transmitting the predetermined authentication information to the user terminal when a use non-permission signal transmitted from the owner terminal in response to the use permission request signal is received, the use non-permission signal being a signal for not permitting use of the vehicle.

\* \* \* \* \*